United States Patent [19]

Sampson

[11] Patent Number: 5,390,113
[45] Date of Patent: Feb. 14, 1995

[54] METHOD AND ELECTRONIC APPARATUS FOR PERFORMING BOOKKEEPING

[76] Inventor: Wesley C. Sampson, 4047 Newcastle Dr., Sylvania, Ohio 43560

[21] Appl. No.: 58,423

[22] Filed: May 7, 1993

Related U.S. Application Data

[63] Continuation-in-part of Ser. No. 505,061, Apr. 5, 1990, Pat. No. 5,212,639.

[51] Int. Cl.$^6$ .............................................. G06F 15/74
[52] U.S. Cl. ................................ 364/419.19; 364/406
[58] Field of Search ............... 364/419.19, 406, 419.17

[56] References Cited

U.S. PATENT DOCUMENTS

| | | | |
|---|---|---|---|
| 4,346,442 | 8/1982 | Musmanno | 364/408 |
| 4,506,326 | 3/1985 | Shaw et al. | 395/700 |
| 4,694,397 | 9/1987 | Grant et al. | 364/408 |

Primary Examiner—Donald E. McElheny, Jr.
Attorney, Agent, or Firm—Brian J. Laurenzo; Kent A. Herink; Brett J. Trout

[57] ABSTRACT

A method and apparatus for electronically performing bookkeeping upon a plurality of accounting journal entries having at least one account number and at least one data component associated with each account number. A chart of accounts having account numbers and opening balances associated with the plurality of journal entries is read electronically. A set of account-section numbers is then created for each account number. The journal entries are electronically read and one of the account-section numbers is assigned to each account number. The assigned account-section numbers and associated data components are then sorted in a predetermined order. A design for the predetermined order is identified and compared with stored design records to see if such a design already exists. If not, the new design is stored. If so, the associated data components are added to the accumulated total for each account-section number. A tally representing the number of account-section numbers is increased by one and an entry number is added to a list for the particular design record. The process is then repeated for each journal entry.

25 Claims, 8 Drawing Sheets

JOURNAL SUMMARY DATA STRUCTURE SCHEMATIC

FIG. 3a SIMPLE ENTRIES

| ACCT | ACCT | $ $ | $ $ | N | P |
|------|------|-----|-----|---|---|
| ACCT | ACCT | $ $ | $ $ | N | P |
| ACCT | ACCT | $ $ | $ $ | N | P |

FIG. 3b THREE-DIMENSION COMPOUND ENTRIES

| ACCT | ACCT | ACCT | $ $ | $ $ | $ $ | N | P |
|------|------|------|-----|-----|-----|---|---|
| ACCT | ACCT | ACCT | $ $ | $ $ | $ $ | N | P |
| ACCT | ACCT | ACCT | $ $ | $ $ | $ $ | N | P |

FIG. 3c FOUR-DIMENSION COMPOUND ENTRIES

| ACCT | ACCT | ACCT | ACCT | $ $ | $ $ | $ $ | $ $ | N | P |
|------|------|------|------|-----|-----|-----|-----|---|---|
| ACCT | ACCT | ACCT | ACCT | $ $ | $ $ | $ $ | $ $ | N | P |
| ACCT | ACCT | ACCT | ACCT | $ $ | $ $ | $ $ | $ $ | N | P |

FIG.5

| | | | | OPENING BALANCES | |
|---|---|---|---|---|---|
| | | | | DEBIT | CREDIT |
| I(1) I(2) | | A(1) | DESCRIPTION (1) | $ | -0- |
| I(3) I(4) | | A(2) | DESCRIPTION (2) | $ | -0- |
| | | | | $ | -0- |
| | | | | -0- | $ |
| | | | | -0- | $ |
| | | | | -0- | $ |
| I(2n-1) I(2n) | | A(n) | DESCRIPTION (n) | $ | -0- |

FIG.7

| | | |
|---|---|---|
| EN(1) | --------- | JOURNAL ENTRY (1) |
| EN(2) | --------- | JOURNAL ENTRY (2) |
| | | |
| | | |
| | | |
| EN(n) | --------- | JOURNAL ENTRY (n) |

FIG. 9

(PRIOR ART)

TRADITIONAL LEDGER PRESENTATION

ACCOUNTS RECEIVABLE

| | |
|---|---|
| OPENING BALANCE 50.00 | |
| #1    1.00 | |
| #2    1.06 | |
| #3    2.00 | |
| #4    2.12 | |

SALES TAX PAYABLE

| | |
|---|---|
| | OPENING BALANCE 2.00 |
| | #2    .06 |
| | #4    .12 |

SALES

| | |
|---|---|
| | OPENING BALANCE 400.00 |
| | #1    1.00 |
| | #2    1.00 |
| | #3    2.00 |
| | #4    2.00 |

FIG.10

(PRIOR ART)

EXAMPLE JOURNAL

| ENTRY I.D. | ACCT # | DESCRIPTION | DEBIT | CREDIT |
|---|---|---|---|---|
| #1 | 20 | ACCOUNTS RECEIVABLE | 1.00 | |
| | 71 | SALES | | 1.00 |
| | | | | |
| #2 | 20 | ACCOUNTS RECEIVABLE | 1.00 | |
| | 56 | SALES TAX PAYABLE | | .06 |
| | 71 | SALES | | 1.00 |
| | | | | |
| #3 | 20 | ACCOUNTS RECEIVABLE | 2.00 | |
| | 71 | SALES | | 2.00 |
| | | | | |
| #4 | 20 | ACCOUNTS RECEIVABLE | 2.12 | |
| | 56 | SALES TAX PAYABLE | | .12 |
| | 71 | SALES | | 2.00 |
| | | | | |

FIG.11

DIAGRAM OF POINTERS FROM ACCOUNTS RECEIVABLE DEBITS

| CASH DEBIT | CASH CREDIT | A/R DEBIT | A/R CREDIT | INV DEBIT | INV CREDIT | (LIST OF ACCOUNT-SECTION NUMBERS) |
|---|---|---|---|---|---|---|
| ACCT | ACCT | $ $ | $ $ | N | P | |
| ACCT | ACCT | $ $ | $ $ | N | P | |
| ACCT | ACCT | $ $ | $ $ | N | P | |
| ACCT | ACCT | $ $ | $ $ | N | P | |

| ACCT | ACCT | ACCT | $ $ | $ $ | $ $ | N | P |
|---|---|---|---|---|---|---|---|
| ACCT | ACCT | ACCT | $ $ | $ $ | $ $ | N | P |

| ACCT | ACCT | ACCT | ACCT | $ $ | $ $ | $ $ | $ $ | N | P |
|---|---|---|---|---|---|---|---|---|---|
| ACCT | ACCT | ACCT | ACCT | $ $ | $ $ | $ $ | $ $ | N | P |
| ACCT | ACCT | ACCT | ACCT | $ $ | $ $ | $ $ | $ $ | N | P |

METHOD AND ELECTRONIC APPARATUS FOR PERFORMING BOOKKEEPING

RELATED APPLICATION

This is a continuation-in-part of U.S. patent application Ser. No. 07/505,061, filed Apr. 5, 1990, now U.S. Pat. No. 5,212,639, entitled Method and Electronic Apparatus For The Classification Of Combinatorial Data For The Summarization And/Or Tabulation Thereof.

BACKGROUND OF THE INVENTION

The present invention relates generally to a method and electronic apparatus for classifying large volumes of raw data and, in particular, to a method and electronic apparatus for performing combinatorial bookkeeping.

Many enterprises generate large volumes of data entries, each such entry having associated with it one or more items representing important information. Typically, larger enterprises are computerized and the data entries are inputted into and/or generated by a mainframe computer and then transferred to a mass storage device such as a magnetic tape for later use in various data analysis and report generating programs. For example, a receiving department or a stock room accepts a delivery of parts to be placed into inventory. At least the part number and quantity must be inputted into the computer for later use in inventory, manufacturing and accounting programs.

Various specialized computer programs have been written to organize large volumes of data entries. For example, U.S. Pat. No. 4,346,442 shows a program for processing data entries related to a securities brokerage/cash management system. In U.S. Pat. No. 4,694,397, there is shown a computer system for interfacing a banking system and a brokerage system. U.S. Pat. No. 4,506,326 discloses an apparatus and method for synthesizing a query for accessing a relational database. Of course, there are also many commercial database management programs available today. However, many specific applications have not been addressed.

For example, when transactions are recorded directly into accounts, it is difficult to see the total effect of any one transaction upon an entity by looking at the accounts. Accordingly, the journal or book of original entry was created and is now an integral part of accounting. There appear to be few, if any, formal reports of the journal in the history of accounting. The first level of accounting data, the journal, has received little research attention. To many observers, the journal is merely a log of activity, i.e. the input data from which a ledger is derived. Other than the "debit-credit balance test" and the "does-the-account-exist test", computer systems often leave the completeness and correctness of accounting matters to auditors and accounting supervisors.

Specifically, with respect to combinatorial bookkeeping, a method of bookkeeping wherein the complete journal entry is processed intact in the bookkeeping records, the two forms which are currently being practiced, that is, double-entry and single-entry, are predominantly manual. A number of single-entry methods have been advanced, including methods utilizing adding machines, posting machines, punched cards, carbon-paper systems, and relational database systems. The present invention of electronic bookkeeping applies predominantly to double-entry bookkeeping, but could also apply to single-entry bookkeeping in the sense that single-entry bookkeeping has features which are concurrent with double-entry bookkeeping.

The traditional practice of double-entry bookkeeping requires two inputs, (a) a log of activities known as the journal and (b) a chart of accounts, the list of criteria or attributes to be measured in the process. Output is a classification of financial effects known as the ledger. Entries in the journal must be composed of accounts included in the chart. The records of both the journal and the ledger contain debit and credit divisions. Transactions are analyzed and entered on the journal so that each transaction contains equal debits and credits (in monetary terms).

Single-entry procedures, on the other hand, tabulate a single item. In its ultimate form, single-entry involves a count of each asset and liability with a final balancing item inserted into the financial statements. More often, single-entry procedures tabulate like items, such as cash receipts from collection of customer accounts. These totals are later converted into double-entry records in many systems of accounting. Conversion of single-entry totals to double-entry records is allowable, but not useful in the present system. A third form of single-entry is the tabulation of non-monetary or other information not required by traditional bookkeeping. This third form is incorporated into the present application.

Journal entries are posted to ledger accounts. All of the information contained in the ledger must be available in a journal entry. The posting is a procedure of sorting and copying, i.e., each part (usually one line of several in an entry) is copied to its proper ledger. The result is a ledger which is in sequence and which also balances in total by the debit and credit criterion. The ledger is itself summarized via a procedure known as trial balance.

A number of approaches have been developed to reduce the sorting and copying activity. Special journals have been designed to summarize large numbers of similar transactions such as selling, purchasing, receiving, payroll, and shipping. Often, the special journals appear in single-entry form and the totals are entered into the double-entry system. These special journals have been incomplete and seemingly all systems of account use a general journal for transactions which do not fit the design of the special journals.

Commercial computerized bookkeeping packages are available Which have the ability to trace from one line of a journal entry posted to a specific ledger account to the other postings of that entry. However, no intermediate record of summaries of like journal entries are utilized. The intermediate summaries in the present application create totals for each 'event' and simplify both the computer and supervisory processes of bookkeeping.

A frequent assumption of computerized general ledger packages is that specific account debits or account credits are limited to one occurrence per transaction. This policy simplifies audit of the transaction and also simplifies the computer process of transaction backup. The above assumption is likewise incorporated into the present invention.

A second assumption of present computerized generalized ledger packages is that a log of activity is maintained either in transaction backup form or in a detailed sequential, historic file of journal entries. These historic and/or backup files are useful and may be utilized in the present invention when operating in batch mode. Real-time operation of the present system would immediately precede the creation of historic or backup files.

Two schools of thought which are pertinent to and incorporated in the present invention are Matrix Accounting and Computer Science techniques of Sparse Matrix. Although Matrix Accounting has been known since 1846, the concept has been limited to two dimensions, relating to the debit and credit dimensions of the ledger. The present invention incorporates multi-dimension matrices into the logic of the journal and preserves the existing journal feature of balance of debit and credit. Sparse matrix techniques are often introduced in studies of data structures. Their success depends upon (a) a low degree of data fill (most possible occurrence of data are in fact vacant) and (b) the existence of a programming language which can allocate a new design for data storage while the program is operating. Until now, the sparse matrix approach has not been used in accounting.

The difficulties encountered in the prior art discussed hereinabove are substantially eliminated by the present invention.

SUMMARY OF THE INVENTION

Accordingly, it is an object of the present invention to provide a method for electronically performing bookkeeping.

It is also an object of the invention to provide a method for electronically performing bookkeeping which eliminates the ledger necessitated in the prior art.

Another object of the present invention is to provide a method which utilizes an intermediate record for electronically performing bookkeeping.

A further object of the present invention is to provide a method for electronically performing combinatorial bookkeeping in which a summary of each type of transaction is created to facilitate supervision of bookkeeping and analysis of transaction flows.

Yet another object of the present invention is to provide a method which utilizes a sparse matrix for electronically performing bookkeeping.

One other object of the present invention is to provide a method for electronically performing bookkeeping which updates the account balances within the chart of accounts.

One further object of the present invention is to provide a method for electronically performing bookkeeping which includes security features for detecting predetermined illegal or unusual transactions for further inspection.

Still another object of the present invention is to provide a method for electronically performing bookkeeping which can generate flow reports thereby eliminating some worksheets necessitated in the prior art.

An additional object of the present invention is to provide a method for electronically performing bookkeeping which includes data other than raw accounting data.

A further object of the present invention is to provide an electronic apparatus for performing bookkeeping.

These and other objects of the present invention will become apparent upon reference to the following specification, drawings and claims.

By the present invention, it is proposed to overcome the difficulties encountered heretofore. The present invention concerns a method and apparatus for electronically performing bookkeeping upon a plurality of accounting journal entries comprising a parental set for a predetermined period of time, each journal entry of the plurality of accounting journal entries having a transaction identifier, at least one account number and at least one data component associated with each account number, each journal entry having been prepared based upon criteria associated with a particular definition within a predetermined chart of accounts. First, the predetermined chart of accounts associated with the plurality of journal entries is read electronically. The predetermined chart of accounts must have at least one account number and each account number has an opening balance. A set of account-section numbers is then created for each account number. The plurality of journal entries is read and one of the account-section numbers is assigned to each of the account numbers in the journal entry. The assigned account-section numbers along with the associated data components are then sorted in a predetermined order. A design for the predetermined order is identified and compared with stored design records to see if such a design already exists. If not, the new design is stored. If so, the associated data components are added to the accumulated total for each account-section number. A tally representing the number of additions to the set of account-section numbers is increased by one and an entry number is added to a list for the particular design record. The process is then repeated for each journal entry.

Opening balances may be updated periodically by adding the accumulated totals for all of the account-section numbers.

Account numbers may include an indicator of criteria associated with the particular definition of the predetermined chart of accounts. For example, if double-entry bookkeeping is performed, the criteria would indicate that separate account-section numbers should be created and assigned for debit and credit for each account number.

A sparse matrix of n-dimension may be used for creating, searching for, and accumulating totals for designs which identify the journal entries.

BRIEF DESCRIPTION OF THE DRAWINGS

In the drawings:

FIG. 5 is a schematic representation of a list of item indicators according to the present invention;

FIG. 7 is a schematic representation of a chain of item indicators according to the present invention;

FIG. 9 is a prior art sample listing of lines of the journal entry transactions in specific ledger accounts;

FIG. 10 is a sample general form of the journal which is similar in both the prior art and the present invention; and FIG. 11 is a sample diagram illustrating the pointers of the present invention.

DESCRIPTION OF THE PREFERRED EMBODIMENT

Figures 1, 2:
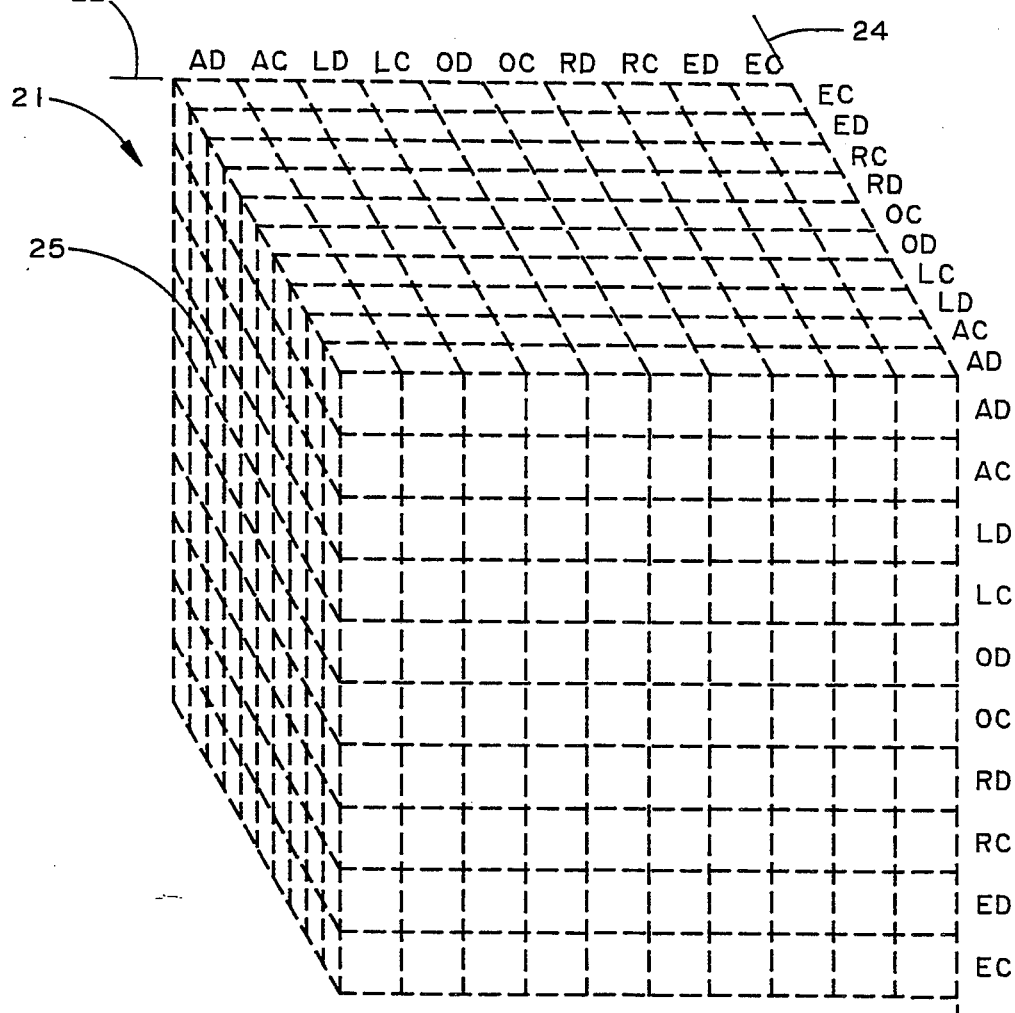
FIG. 1 is a schematic perspective view of a prior art two-dimensional accounting matrix.
FIG. 2 is a schematic perspective view of a three-dimensional accounting matrix according to the present invention.

The present invention relates to a method and apparatus for electronically performing bookkeeping upon a plurality of accounting journal entries comprising a parental set for a predetermined period of time, each journal entry of the plurality of accounting journal entries having a transaction identifier, at least one account number and at least one data component associated with each account number, each journal entry having been prepared based upon criteria associated with a particular definition within a predetermined chart of accounts.

The plurality of journal entries to be processed and classified in accordance with the present invention is known as a parental set of items. A parental set, in general, includes all possible combinations drawn from a list wherein no item from the master list can appear more than once in any combination. Two conditions apply: (1) the particular sequence of items within the combination is not important. Synonyms, the different sequences of identical item indicators are sorted into ascending sequence and their synonymous identity destroyed, and (2) specific combinations are expected to repeat frequently.

In general, as each data entry is created or read from storage, a mapping function such as a hashing algorithm is applied to assign item indicators for each of the item numbers based upon the associated quantities thereby generating an expanded parental set. An item indicator uniquely defines an associated item in the expanded parental set, reflects the originality of the item in the expanded parental set, and identifies the use of the item in the context of the quantity. The joint usage of a mapping function (hashing) and a multi-dimensional sparse matrix, which will be discussed hereinafter, allows the data to drive the storage and much of the retrieval of information. This is thus a predominantly data-driven process.

The item indicators for tire data entry are sorted into ascending numerical sequence and an n-dimension sparse matrix is selected where "n" is the number of items in the data entry. If the present combination of item indicators is new, a design record is created for the database based upon the sparse matrix and including the item indicators, the associated quantity sums, the total number of data entries summarized in the design record and a pointer (a list or chain of entry numbers) to the records of the data entry detail. The quantities for the present data entry are added to the quantity sums and the entry number is stored in the pointer chain. After all the data entries have been processed, a search routine can be utilized to review the various design records as desired.

A specific example of a practical use for the system according to the present invention is in the field of bookkeeping. Raw data, typically provided from a computer operation or a mass storage device such as a computer backup tape, can be a plurality of journal entries (data entries) each of which is formed of a minimum number of lines which correspond to conditions defined in the chart of accounts, i.e., single-entry accounts are associated with journal entries with one-line minimum, double-entry accounts are associated with journal entries with two-line minimum and with the condition that debit dollars of the journal entry equal credit dollars of the same entry. Triple-entry accounting has been suggested, but the concept has not been implemented.

The plurality of journal entries to be processed and classified in accordance with the present invention is known as a parental set of lines. Each classified item, known as an account in bookkeeping, must contain information regarding its title, account number, and its opening balance, debit or credit. A list of all account numbers and associated data components, a chart of accounts, is utilized to generate account-section numbers (item indicators). For example, one account-section number can represent a debit to an account number and another account-section number can represent a credit to the same account number. Thus, with respect to double-entry bookkeeping, an account-section number is generated for activity which, under the prior art, is copied to either side, debit or credit, of a particular account. A mapping function is applied to the journal entry lines in the parental set to assign the appropriate account-section numbers resulting in an expanded parental set. An activity is an account-section number associated with a particular quantity.

With respect to double-entry bookkeeping, the method of the present invention replaces the transaction records of the ledger with an intermediate record. The intermediate record is referenced to a chart of accounts so as to retain balance and transaction totals of the information found in a ledger.

The intermediate record is a total of all like transaction designs which are found in the journal. The transaction design is defined as that combination of account-debits and account-credits from the Chart of Accounts which is used in a complete journal entry. The values and explanations of the journal entry are data held within the transaction design.

As each journal entry is encountered in the bookkeeping process, the computer checks whether that design is contained in the database of journal entry summaries. If not, a new summary is created to match the account-debit and account-credit attributes of the journal entry being processed. At the point of summary creation, a new combination is indicated and security procedures can be invoked. The pointers which reference ledger totals to the summaries are reorganized with each new design added to the database.

The monetary (or other) values of each journal entry are added to the summary which matches the entry design. A list of identifiers of entries which fit each particular design is maintained so the detail may be extracted as needed. In addition, the list of identifiers allows the system to be verified by audit or restored upon machine failure.

The amount of computer disk movement is expected to be reduced through the use of this database of journal entry summaries. In the prior art, each line of a journal entry was copied to each ledger account affected, whereas in most cases, the proposed system would add all totals on one record and write to disk or other memory only once. The process of this application will thus operate faster.

Such a database which aggregates repetitious mainframe accounting journal entries in a database will enable two improvements to the bookkeeping process. First, the manual ledger is replaced by an electronic intermediate record which is more versatile and easier to manipulate for real-time balances, etc. Second, the ability to identify entry combinations before adding to totals and tally is expected to aid in security procedures and printed reports. The latter eliminates some of the need for manual worksheets.

The ledger and trial balance procedure of accounting is not a summary of journal entries. It is a summary of individual lines of the journal entries. Distinctions involved in the basic classification of transactions become obscured in the normal bookkeeping process. A credit sale is not precisely the same as a cash sale, yet both are normally posted to the Sales account.

Similarly, a taxable sale is not identical to a non-taxable sale. The word "design", defined above, can be used to identify the forms of journal entries. Examples of the forms of a non-taxable service sale and a taxable service sale are:

| Debit Assets | $500 | |
| Credit Revenues | | $500 |
| and | | |
| Debit Assets | $525 | |
| Credit Liabilities | | $25 |
| Credit Revenues | | $500 |

In the system, according to the present invention, all journal entries of a given design, i.e., those which contain the identical debit or credit attributes of the identical accounts, are aggregated in a database design record which contains totals for the dollar values of each summary entry as well as a tally of the number of occurrences of the particular design.

Bookkeeping usage implies that the database will be created earlier in time, perhaps immediately after a journal entry is created or entered. Three forms of inspection can be applied to newly-created entries. First, specific non-allowable entries can be placed in the database before bookkeeping begins, with an alarm reported whenever said non-allowable entry has, in fact, been attempted. Second, a supervisory routine can be called each time a new combination has been entered or a certain dollar volume exceeded. Third, short time periods of data entry can be reprocessed and inspected by a supervisor. Various limits can also be set within the pointer chains for each account-section number or account balance calculation to cause notification under present conditions.

It is to be understood that the associated data component need not be limited to numerals and, depending upon the criteria associated with the chart of accounts, can be any combination of numbers and/or letters and/or other symbols and a quantity. For example, in double-entry bookkeeping, the associated data component would be a dollar amount. However, in single-entry bookkeeping, the associated data component could represent a manufacturing component having an associated part number (item number) and quantity.

In this process, the entire journal entry is the canonical record of bookkeeping organization. In the prior art, an individual line of the journal entry has been the canonical record. The prior art relied upon the 'posting' process, a sort-and-copy procedure, wherein all lines of the journal were sorted and copied to ledger accounts. This process effectively sorts the journal entries as whole entities. Identical entry designs are added to a summary; and, the sequential record of entry numbers added to each summary provides a convenience means of locating individual entries in the sequential log made at transaction time.

Synonyms can occur and are eliminated by sorting the individual record lines of the input journal entry on the account number field. The result of the sort is a traditional entry in ascending account number sequence.

With respect to double-entry bookkeeping, the system begins with the list or chart of accounts of all classifications of the entity which are used in bookkeeping. However, in addition to conventional double-entry bookkeeping, classifications pertaining to physical quantities or other information to be tabulated may be included. Only those classifications related to double-entry bookkeeping need to be balanced by debit-equal-credit rules.

Single-entry items may be included in a double-entry journal entry by reference to the chart of accounts. Those accounts designated as double-entry will be tabulated in one group and the group total debits and total credits tested for equality. Then single-entry lines will be appended to the double-entry group before the matrix selection and storage begins. The size of combination-records will increase when single-entry data is appended to double-entry data.

Although matrices have been noted in accounting literature since Augustus De Morgan's 5th edition of *Elements of Arithmetic* (1846), their usefulness has been obscured until Mattesich ("Accounting and Analytical Methods" 1964) integrated computer capabilities into the discussion. Most, if not all, discussions of the matrix have assumed existence of a conventional set of books and trial balances. Prior art matrix methods appear to depend upon the substitution of two dimensions of a matrix for the debit-and-credit of bookkeeping.

Figures 3, 4:
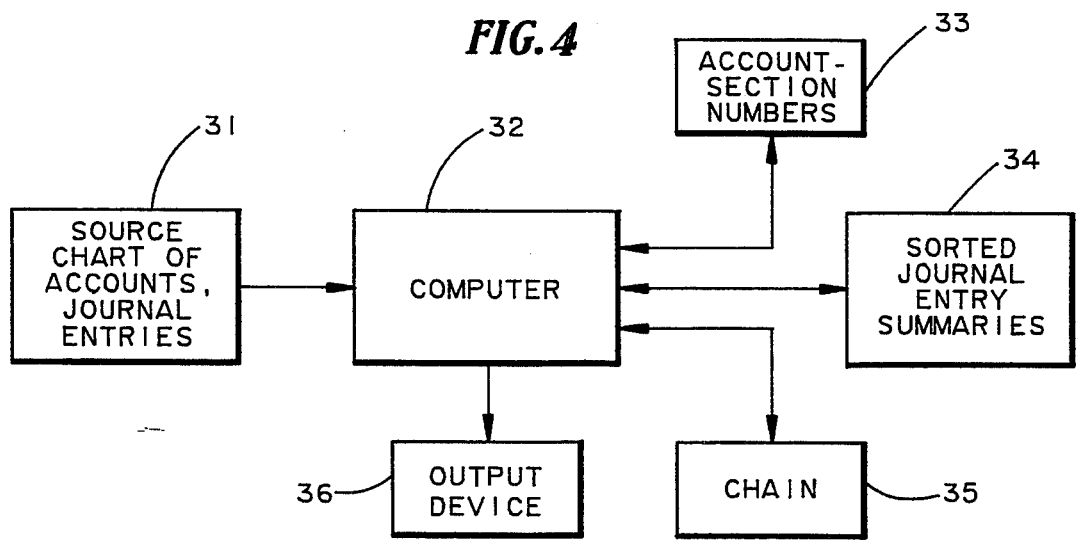
FIG. 3 is a schematic representation of the accounting journal summary data structure according to the present invention.
FIG. 4 is a block diagram of the apparatus according to the present invention.

The present invention brings a new approach to accounting the aggregation of detail of the designs of journal entries. First, the ability to audit is preserved through identification of the specific transactions which were summarized. The journal entry, complete with debit and credit, is the canonical record in the present invention. Journal entries occur in varying sizes, and require variable-length records. Previous accounting database literature has emphasized the relational database model, which normally uses fixed length records. The following discussion, along with FIGS. 1, 2 and 3, illustrate the problem and solutions to matrix classification of journal entries.

The prior art of bookkeeping has included a list of financial attributes known as a chart of accounts and the division of each account identified in the chart into debit and credit sections. Transactions are posted to each section of the account and balances of each account are determined. The balance of any account is the difference between any opening debit balance plus debit transactions for the period and any opening credit balance plus credit transactions for the period. The difference is reported as the ending balance for whichever section is a larger number.

The prior literature of bookkeeping is almost entirely in terms of ledger accounts, often described as T-accounts. The journal, in the prior art, is a log of activity for facility of work and supervisory and audit tests of completeness. Nevertheless, the journal entry is the "atom" of double-entry bookkeeping because the practice of debit equals credit begins with each journal entry.

In FIG. 1, there is shown a schematic view of a lesser-known prior art, the two-dimensional accounting matrix. The budget model of a business firm (from Mattesich, 1964) has been compressed into the five major classifications of accounts: ASSETS, LIABILITIES, OWNERSHIP, REVENUES and EXPENSES. All account titles (first letter only) appear along both dimensions of a matrix 11 having an "X" axis 12 for Credits and a "Y" axis 13 for Debits. A $500 sale of service, requiring entries of debit ASSETS and credit REVENUES, would appear in a cell 14.

The matrix approach illustrated in FIG. 1 is envisioned to contain a master of total journal entry for each design. All journal entries which (as above) only debited assets and credited revenues would be added to the master which is schematically found in the cell 14 at the intersection of ASSETS (Debits) and REVENUES (Credits).

The journal detail of bookkeeping does not match the logic of a two-dimension matrix. Compound journal entries, those which contain more than two elements, far outnumber simple entries and they cannot be expressed in a two-dimension summary. One can assign multiple debits and credits within a two-dimension matrix (through clearing of accounts, for instance), but the transaction then becomes awkward to identify and audit. The aggregation of journal detail requires multi-dimension matrices. Consider an entry to cash, sales, and sales tax payable which occupies one cell of a three-dimension matrix 21 as shown in FIG. 2. Not only is a three-dimension matrix needed, but provision must also be made for debit (D) and credit (C) within each account. The problem becomes more complex with larger entries.

One component of the solution is to modify account numbers within the computer to adjust for the debit and credit sections of each ledger account or internally assign different account numbers to the debit and credit sections of each ledger account. In other words, the chart of accounts is internally doubled to provide separate accounts for the debit and credit components of each account. This adaptation of double-entry is transparent to the accountant and allows the data structure to classify unique, rather than paired, information for each account. At this point, a particular account-debit or account-credit can be used to define specific rows or cells along the axis of a matrix. Although the matrix is theoretically larger, each design occurrence of a journal entry is then unique.

Potentially, the matrix shown in FIG. 2 could hold up to one thousand combinations, the total number of cells. In general, an n-account journal entry will require an n-dimension matrix with up to $M^n$ values stored where "M" is two (in double-entry mode) times the number of accounts in the ledger. However, there are usually relatively few journal entry designs occurring in any given matrix. This allows the use of a series of sparse matrices, which require space to be allocated for only those journal entries which actually exist. Each size of journal entry, i.e., two-account, three-account, four-account, etc., requires a separate matrix.

The example shown ill FIG. 2 shows a three-dimension matrix which uniquely classifies the taxable sale discussed above. The account designations previously used in FIG. 1 are abbreviated such as "Ad" for ASSETS (Debits). The first element of the journal entry, a debit to cash, is classified on an "X" axis 22, the credit to Sales Tax Payable is shown on a "Y" axis 23, and the credit to sales appears on a "Z" axis 24 resulting in an intersection at a cell 25.

The matrix construction process involves the steps of:
(a) reading a completed journal entry;
(b) determining the size of the journal entry in terms of number of accounts posted;
(c) replacing the account numbers with internal computer references;
(d) sorting the component lines into ascending sequence to eliminate synonyms;
(e) determining whether the journal entry design has been previously processed;
(f) if not, creating and linking a record for that design;
(g) adding the entry being read to totals for that design;
(h) recording the entry number in a cumulative chain for each design occurrence; and
(i) updating real time values of individual trial balance accounts.

Although the stored journal entry summaries are abstractly described as cells of multi-dimension matrices, implementation of a sequence of records using the sparse matrix technique organizes all possible combinations. Indices constructed from this structure provide speedy retrieval.

Account numbers are sequential in the chart of accounts. Therefore, any account number defines a location in that sequence. The position of the account number thus defines the specific cell, row, or other dimension necessary. The account numbers are thus substituted for subscripts in matrix notation.

The usual notation for cells of matrices is $X(i)$, $Y(j)$, $Z(k)$, where X, Y, and Z are axes of the matrix and i, j, and k are the locators along the axes. FIG. 2 identifies a cell at X (asset, debit), Y (liabilities, credit), and Z (revenue, credit). The account numbers become the subscripts and are recorded in the records represented in FIG. 3.

The record which identifies the combination need not mention X, Y, and Z—these axes can be inferred from the length of the record. The cell identifier selects the position of the cell along each axis. The representation of specific cells of matrices as variable-length combinations results in a variable-length record which can be represented in two dimensions—a 'flat file.' The result is a total of dollars for each account and pointers (P in FIG. 3) to audit detail for each unique design of journal entry. The matrix construction process is oriented toward one journal entry. The tally of entries (N in FIG. 3) which fit a summary is incremented with each entry. This short sequence of processing is designed to coordinate with real-time computer systems.

FIG. 3 displays the organization of summaries of journal entries in the database. In FIG. 3, "ACCT" represents the account-section which is the account number modified by debit or credit, "$$" is the total dollars for the corresponding account-section accumulated from all entries of identical design, "N" is the number of journal entries summarized, and "P" is a pointer to records of the journal entry detail formed as a chain of entry numbers. Each horizontal row represents a database design record for accumulating a different design. Although the term "account number" has been used above, any suitable account indicator symbol can be utilized with the present invention.

The complete detail of smaller journals can be stored in entry number sequence for retrieval of detail. At some point, the volume of journal data of larger companies will require that only the entry numbers may be available for retrieval. In those larger firms, a search of files of the mainframe computer is required to retrieve the details of the entries.

In FIG. 4, there is shown an apparatus for performing the method with respect to accounting data in accordance with the present invention. A source of information or data 31, such as a computer process or a magnetic tape on a tape drive, provides a listing of a chart of accounts and all of the journal entries to be summarized. The source 31 is connected to an input of a computer 32. The computer 32 reads the chart of accounts and creates separate account-section numbers for the planned sections of each account. The computer 32 is connected to a storage or memory device 33 for storing the account-section numbers created from the chart of accounts. Once the account-section numbers have been stored, the computer 32 does not have to read the chart of accounts each time additional related raw data is to be processed. The programmer can identify the account-section number from the account number modified by debit or credit through a hashing technique. Hashing techniques are well known in the art.

The computer 32 reads the journal entries from the data source 31. The computer 32 assigns one of the account-section numbers to each debit and credit associated with a double-entry account number in each journal entry. The assigned account-sections are sorted into ascending account-section numerical order for each journal entry. Now the computer 32 can identify the design, the unique set of account-sections associated with a journal entry. The sparse matrix size is determined based upon the number of account-sections associated with the journal entry. If the design is new, the appropriate design record is created. If a journal entry of the same design has been processed previously, the corresponding design record already exists in a memory 34 connected to the computer 32. The computer 32 adds the dollar or other amounts of each account-section of the current journal entry into the associated design record, adds one to the number of journal entries stored in the record and updates the record pointer by storing the entry number for the journal entry in a chain.

As stated above, if the memory capacity is available, the journal entries can be stored, in a memory 35 connected to the computer 32, in the order defined by the chain of each design record or simply by entry number. Thus, the journal entries are readily available to the computer 32 for inspection when desired. If the memory capacity is inadequate, the entry numbers are available to permit a search of the mainframe memory or the backup tapes for the required journal entry records. The computer 32 also has an output connected to an output device 36, such as a video display terminal or a printer, for displaying information such as the data and reports.

In addition, a chart of accounts with updated balances can be produced on demand. Within double-entry, for each account, the opening debit balance (from FIG. 5) is added to the total debits as accumulated in the procedure outlined herein. Similarly, the opening credit balance (from FIG. 5) is added to total credits accumulated for the account. The two totals for the account are compared and the net difference is placed into the new balance, debit or credit, whichever is the greater of the two totals. At the end of this procedure, the operator may optionally reset the entire procedure by copying all materials and all chains of journal entry numbers to a magnetic file device. In such case, this procedure, the equivalent of the manual step of "closing the books," creates a chart of accounts with present ending balances which become the opening balances to begin a new period.

FIG. 10 illustrates the retained portion of the prior art, an example of four journal entries, two of which are taxable credit sales (#2 and #4) and two of which are non-taxable credit sales (#1 and #3). These two forms of journal entry also match the matrix cells used in FIGS. 1 (for a two-line entry) and 2 (for a three-line entry). FIG. 9 illustrates the prior art whereby the entries posted, i.e., the entries are disassembled and the individual lines are copied and added to the account-sections of a ledger account. The sparse matrix record of FIGS. 3, 8 and 11 accomplishes the accumulation of account-section information previously performed in operations related to FIG. 9 and, in addition, provides an organization of the transactions.

FIG. 5 shows two columns for possible opening balances, one for opening debit balance and one for opening credit balance. The number of balance data columns determines the method of bookkeeping to be used—one balance column indicates that the account is to be used in single-entry mode and two balance columns indicates double-entry operation.

Figure 8:
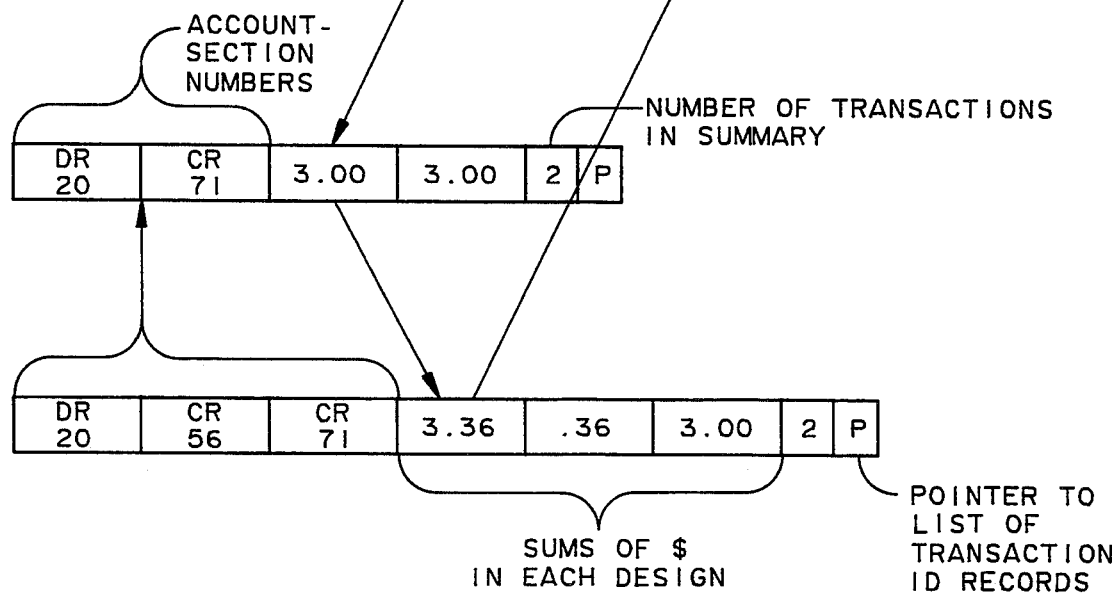
FIG. 8 is a sample chart of accounts and trial balances showing the intermediate record of the present invention as applied to double-entry bookkeeping.

FIG. 8 illustrates the effect of transactions upon the opening double-entry chart of accounts and its equality of debits and credits. FIG. 5 illustrated the necessary information to create account-sections and FIG. 8 illustrates the tabulation of journal entry detail to new balances. Three accounts have been selected, those which are included in the entries of FIG. 10. Two summary records result from the entries in FIG. 10, they are shown on the lower portion of FIG. 8. The dollars from the journal entries are sorted to the same sequence in the sparse record (FIG. 3) as the account-section numbers. The first account-section number in each record is the debit to Accounts Receivable. New debit balances are found by adding the opening balance and all the account-section numbers which debit Accounts Receivable to a new total of debits to that account as diagrammed in FIG. 8.

FIG. 11 illustrates a chain of pointers which link like account-section numbers for the accumulation of totals from account-section numbers created from the chart of accounts (FIGS. 5 and 8). The pointers identify specific matrix records which contain the same account-section number, in FIG. 11, the debits to Accounts Receivable. ACCT represents account-section numbers, $$ represents the total dollars to the corresponding account accumulated from all entries of identical design, N represents the number of journal entries accumulated, and P represents the pointers.

The hardware required to implement the apparatus shown in FIG. 4 is modest. The data source 31 can be a real-time computer process or a magnetic tape reader for reading the backup tapes from a mainframe accounting data processor. The data source 31 can also be each individual entry as verified by a computer in real-time operation. The memories 33, 34 and 35 can be separate memories or a large disk storage device interfaced with the computer 32. A programming language with dynamic allocation capabilities such as Pascal, Modula-2 and C can be utilized. The apparatus shown in FIG. 4 also can be used to perform the method according to the present invention on other types of data. In general terms, the chart of accounts can be a list of item numbers and associated descriptions, the journal entries can be data entries, and the account-section numbers can be item indicators.

Figure 6:
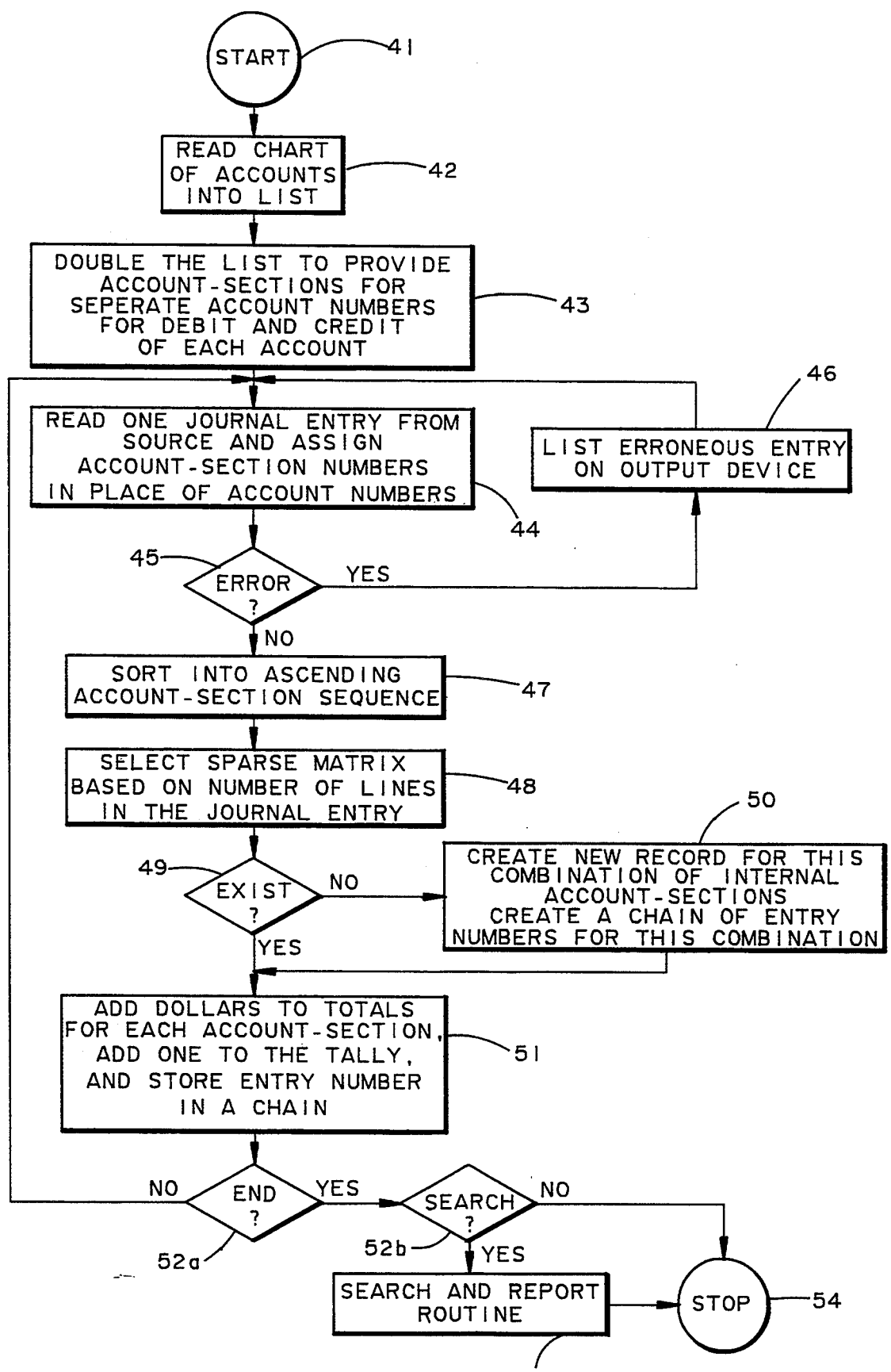
FIG. 6 is a flow diagram of the method according to the present invention applied to double-entry accounting journal entries.

A flow diagram of the method according to the present invention for performing double-entry bookkeeping on a plurality of accounting journal entries is shown in FIG. 6. The computer 32 of FIG. 4 is programmed to perform a set of instructions starting at a circle 41. The computer 32 enters an instruction set 42 which causes it to read a chart of accounts, related to the journal entries to be summarized, from the data source 31 into a list. The program then enters an instruction set 43 which creates and stores double-entry account-section numbers by doubling the list. This process is typically implemented by adding separate designations for debit and credit to the account numbers from the chart of accounts.

A schematic representation of a list of double-entry item indicators for our accounting example is shown in FIG. 5. The chart of accounts for the parental set of lines includes an account number, A(l) through A(n), each with an associated account description, DESCRIPTION (l) through DESCRIPTION (n) and opening balances of account, either debit or credit. An account-section number I(l) is assigned to a debit for account number A(l) and a separate account-section number I(2) is assigned to a credit for the same account number. Thus, account-section numbers I(l) through I(2n) are created.

The program then enters an instruction set 44 wherein the computer 32 reads a journal entry from the parental set in the data source 31 and assigns corresponding account-section numbers to each of the account numbers associated with this journal entry. The program enters a decision point 45 which is designed to detect any errors which may have been made in the reading of the journal entry from the source. If an error is detected, the program branches at "YES" to an instruction set 46 to list the erroneous entry on the output device 36 shown in FIG. 4. If no error is detected, the program branches at "NO" to an instruction set 47 where it sorts the assigned account-section numbers, along with their associated dollar quantities or monetary fields, into ascending numerical order.

As the next step in the program, an instruction set 48 is entered wherein a specific multi-dimensional sparse matrix is selected based upon the account sections posted in the journal entry. The program then enters a decision point 49 to check whether this combination of account-sections or design has had a record created for any previous journal entries. If the combination of account-sections does not exist, the program branches from the decision point 49 at "NO" to an instruction set 50. The program creates a new record and creates a chain for the entry IDs of this combination. The program then enters an instruction set 51.

If the combination exists, the program branches from the decision point 49 at "YES" to the instruction set 51. The program adds each of the dollar amounts associated with the account-sections of the journal entry to any previous totals, adds one to the tally, and stores the entry IDs in a chain. The program then enters a decision point 52a which checks to determine whether the end of the data available from the data source 31 has been reached.

In FIG. 7, there is shown a schematic representation of a chain of entry IDs, EN(l) through EN(n), identifying the original journal entries, JOURNAL ENTRY (l) through JOURNAL ENTRY (n), which share a unique design. Each of the records shown in FIG. 3 contains a pointer which begins a chain of journal entry identifiers. The "N" field in FIG. 3 contains the number of journal records identified in the chain for each summary.

In FIG. 6, if all the journal entries have been read from the data source 31, the program branches from the decision point 52a at "YES" to a second decision point 52b which checks to determine whether a search and report operation is desired. If no, the program branches from the decision point 52b to circle 54 and stops. If yes, the program begins a search and report routine as discussed above. If additional journal entries are available to be read, the program branches from the decision point 52a at "NO" and returns to the instruction set 44 to read the next journal entry. After the search routine has been completed, the program enters a circle 54 and stops.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while single-entry and double-entry bookkeeping have been discussed herein, it is anticipated that the invention could be used to perform triple-entry bookkeeping as well as other variations.

What is claimed is:

1. A method for electronically performing bookkeeping upon a plurality of accounting journal entries, said plurality of accounting journal entries comprising a parental set for a predetermined period of time, each journal entry of said plurality of accounting journal entries comprising a transaction identifier, at least one account number and at least one data component associated with each said account number, each journal entry having been prepared based upon criteria associated with a particular definition within a predetermined chart of accounts, said method comprising the steps of:

(a) electronically reading said predetermined chart of accounts associated with said plurality of journal entries, said predetermined chart of accounts having at least one account number, each of said account numbers having an opening balance;

(b) creating a set of account-section numbers for each said account number;

(c) reading one of said plurality of journal entries and assigning one of said account-section numbers to each said account number in said journal entry;

(d) sorting said assigned account-section numbers along with said associated data components into a predetermined order;

(e) identifying a design corresponding to said predetermined order of said assigned account-section numbers and associated data components;

(f) checking stored design records for a record associated with said design and creating a design record for said design if no such record exists;

(g) adding said associated data component to an accumulated total for each said account-section number for design records corresponding to said stored design records, adding one to a tally representing the number of additions to said account-section numbers, and adding an entry number to a list for said design record; and (h) repeating steps (c) through (g) for each journal entry.

2. The method, according to claim 1, in which said opening balances are updated by adding said accumulated totals for all of said account-section numbers.

3. The method, according to claim 1, wherein each of said account numbers includes an indicator of criteria associated with said particular definition within said predetermined chart of accounts.

4. The method, according to claim 3, wherein said step (b), for a minimum number of said data components greater than one, further comprises creating separate account-section numbers for debit and credit for each said account number.

5. The method, according to claim 3, wherein said step (c) reflects the criteria associated with said minimum number of said data components.

6. The method, according to claim 3, wherein said steps (a) and (b) are performed by reading said chart of accounts into a list and modifying said list to create the number of said account-section numbers for each said account number in accordance with said indicator of criteria.

7. The method, according to claim 1, wherein said step (c) is performed by applying a mapping function to said one journal entry to assign said account-section numbers based upon an account number and the usage associated with each of said lines of said one journal entry.

8. The method, according to claim 1, including a step of checking said one journal entry for errors after said step (c).

9. The method, according to claim 1, wherein said step (e) further comprises identifying an n-dimension sparse matrix where "n" is the number of said account-section numbers associated with said one journal entry and forming said design based upon said sparse matrix.

10. The method, according to claim 1, wherein said step (g) includes adding said entry number to a chain of entry numbers to create a set of pointers.

11. The method, according to claim 1, wherein said associated data component is a dollar amount.

12. The method, according to claim 1, wherein said associated data component is a quantity other than a dollar amount.

13. A method for electronically performing bookkeeping upon a plurality of accounting journal entries, said plurality of accounting journal entries comprising a parental set for a predetermined period of time, each journal entry of said plurality of accounting journal entries comprising a transaction identifier, at least one account number and at least one data component associated with each said account number, each journal entry having been prepared based upon criteria associated with a particular definition within a predetermined chart of accounts, said method comprising the steps of:
 (a) electronically reading said predetermined chart of accounts associated with said plurality of journal entries, said predetermined chart of accounts having at least one account number, each of said account numbers having an opening balance;
 (b) creating a set of account-section numbers for debit and credit for each said account number;
 (c) reading one of said plurality of journal entries and assigning one of said account-section numbers to each said account number in an associated line of said one journal entry to reflect debits and credits;
 (d) sorting said assigned account-section numbers along with said associated data components into ascending numerical order;
 (e) selecting a sparse matrix corresponding to the number of account-section numbers associated with said one journal entry;
 (f) checking stored design records for a record associated with said design and creating a new design record for said design from said sparse matrix if no such record exists;
 (g) adding a dollar amount from said one journal entry to an accumulated total for each said account-section number for design records corresponding to said stored design records, adding one to a tally representing the number of additions to said account-section numbers, and adding an entry number to a list for said design record; and
 (h) repeating steps (c) through (g) for each journal entry.

14. The method, according to claim 13, in which said opening balances are updated by adding said accumulated totals for all of said account-section numbers.

15. The method, according to claim 13, wherein said steps (a) and (b) are performed by reading said chart of accounts into a list and doubling said list to create two of said account-section numbers for each said account number.

16. The method, according to claim 13, wherein said step (c) is performed by applying a mapping function to said one journal entry to assign said account-section numbers based upon an account number and a dollar amount associated with each of said lines of said one journal entry.

17. The method, according to claim 13, including a step of checking said one journal entry for errors after said step (c).

18. The method, according to claim 13, wherein said step (e) further comprises identifying an n-dimension sparse matrix where "n" is the number of said account-section numbers associated with said one journal entry and forming a design record based upon said sparse matrix.

19. The method, according to claim 13, wherein said step (g) includes adding said entry number to a chain of entry numbers to create a set of pointers.

20. The method, according to claim 13, including a step of checking said stored design records for undesirable entries.

21. An apparatus for electronically performing bookkeeping upon a plurality of accounting journal entries, said plurality of accounting journal entries comprising a parental set for a predetermined period of time, each journal entry of said plurality of accounting journal entries comprising a transaction identifier, at least one account number and at least one data component associated with each said account number, each journal entry having been prepared based upon criteria associated with a particular definition within a predetermined chart of accounts, said apparatus comprising:
 (a) a data processing means having a data input adapted to be connected to a source of information including said predetermined chart of accounts associated with said plurality of journal entries, said predetermined chart of accounts having at least five account numbers, each of said account numbers having an opening balance;
 (b) means for creating and storing a set of account-section numbers for each said account number connected to said data processing means;
 (c) said data processing means including means for reading said journal entries from said source of information and assigning a corresponding one of said account-section numbers to each said account number in said journal entries; and (d) means connected to said data processing means for storing a plurality of design records, each said record being associated with a different design journal entry, said data processing means adding said associated data components from each of said journal entries into one of said design records corresponding to the design of each said journal entry.

22. The apparatus, according to claim 21, including an output device connected to said data processing means for displaying information based upon said journal entries.

23. The apparatus, according to claim 21, wherein said data processing means further comprises means for sorting said account-section numbers along with said associated data components into a predetermined order.

24. The apparatus, according to claim 21, wherein said data processing means further comprises means for selecting a sparse matrix of a dimension corresponding to the number of said account-section numbers in one of said journal entries and creating a design record based upon said sparse matrix and said account-section numbers.

25. The apparatus, according to claim 21, including means for storing a list connected to said data processing means for storing an entry number for each said journal entry previously entered.

* * * * *